US012556368B2

(12) United States Patent
Mueller et al.

(10) Patent No.: US 12,556,368 B2
(45) Date of Patent: Feb. 17, 2026

(54) HIGH THROUGHPUT DATA FLOW FOR SHA-2 HASHING MODULE

(71) Applicant: INTERNATIONAL BUSINESS MACHINES CORPORATION, Armonk, NY (US)

(72) Inventors: Silvia Melitta Mueller, St. Ingbert (DE); Manoj Kumar, Yorktown Heights, NY (US); Niels Fricke, Herrenberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 266 days.

(21) Appl. No.: 18/453,823

(22) Filed: Aug. 22, 2023

(65) Prior Publication Data

US 2025/0070957 A1    Feb. 27, 2025

(51) Int. Cl.
  *H04L 9/06*    (2006.01)
(52) U.S. Cl.
  CPC .................................. *H04L 9/0643* (2013.01)
(58) Field of Classification Search
  CPC .......................... H04L 9/0643; H04L 2209/12
  See application file for complete search history.

(56) References Cited

U.S. PATENT DOCUMENTS

| | | | |
|---|---|---|---|
| 8,275,125 B2* | 9/2012 | Vijayarangan | H04L 9/0643 380/28 |
| 9,164,725 B2* | 10/2015 | Boersma | G06F 7/00 |
| 10,346,343 B2 | 7/2019 | Suresh et al. | |
| 10,783,279 B2 | 9/2020 | Pedersen et al. | |
| 2012/0128149 A1* | 5/2012 | Boersma | H04L 9/3239 380/28 |
| 2014/0189368 A1* | 7/2014 | Wolrich | G06F 9/30145 713/190 |
| 2017/0147340 A1* | 5/2017 | Yap | H04L 9/0643 |
| 2022/0376893 A1 | 11/2022 | Fan et al. | |

FOREIGN PATENT DOCUMENTS

| | | |
|---|---|---|
| CN | 111064561 A | 4/2020 |
| WO | 2025/040444 A1 | 2/2025 |

OTHER PUBLICATIONS

"Secure Hash Standard (SHS)," US Dept. Commerce, Information Technology Laboratory National Institute of Standards and Technology, Federal Information Processing Standards Publication, FIPS Pub 180-4, Aug. 2015, 36 pp.

S. Gulley, et al., "Intel SHA Extensions," Intel Corporation White Paper, Jul. 2013, 22pp.

(Continued)

*Primary Examiner* — Mohammed Waliullah

(74) *Attorney, Agent, or Firm* — KONRAD, RAYNES, DAVDA & VICTOR LLP; Rabindranath Dutta

(57) ABSTRACT

Provided are a method, a system, a computer program product, an Application Specific Integrated Circuit, and a cryptographic module, where a partitioning is performed of a SHA-2 state update into three blocks. A set of operations associated with the three blocks are executed in a pipelined manner, where each block feeds back for computation into itself.

15 Claims, 12 Drawing Sheets

(56) References Cited

OTHER PUBLICATIONS

H. Michail, et al., "Ultra-High Speed SHA-256 Hashing Cryptographic Module for IPSEC Hardware/Software Codesign,", Proceedings of the International Conference on Security and Cryptography, 2010, pp. 309-313.
U.S. Appl. No. 17/884,704, filed Aug. 22, 2023.
Z architecture: http://publibfp.dhe.ibm.com/epubs/pdf/a227832c.pdf.
International Searching Authority, "Notification of Transmittal of the International Search Report and the Written Opinion of the International Searching Authority, or Declaration," Patent Cooperation Treaty, Oct. 25, 2024, 11 pages, International Application No. PCT/EP2024/072325.
Martino et al. "SHA-2 Acceleration Meeting the Needs of Emerging Applications: A Comparative Survey", IEEE, Feb. 7, 2020, pp. 28415-28436, vol. 8.

\* cited by examiner

HIGH THROUGHPUT DATA FLOW FOR SHA-2 HASHING MODULE

BACKGROUND

Embodiments relate to a method, system, and computer program product for high throughput data flow for a SHA-2 hashing module.

The Secure Hash Algorithm (SHA) is a cryptographic hashing algorithm specified by the National Institute of Standards and Technology (NIST). The SHA family of algorithms are used in many cryptographic applications, including applications for maintaining data integrity, message authentication, and digital signatures.

A hashing algorithm processes a message and generates a fixed length message digest. SHA algorithm corresponds to a one-way function, as the original message cannot be determined from the message digest.

Secure Hash Algorithm 1 (SHA-1) is a cryptographic hash function which is designed by United States National Security Agency. SHA-1 takes an input and produces a 160 bits hash value. The output produced by this function is converted into a 40 digits long hexadecimal number.

Secure Hash Algorithm 2 (SHA-2) is a set of cryptographic hash functions designed by the United States National Security Agency. SHA-2 is built using the Merkle-Damgard construction, from a one-way compression function built using the Davies-Meyer structure from a specialized block cipher. The SHA-2 family consists of six hash functions with digests (hash values) that are 224, 256, 384 or 512 bits: SHA-224, SHA-256, SHA-384, SHA-512, SHA-512/224, SHA-512/256. SHA-256 and SHA-512 are novel hash functions computed with eight 32-bit and 64-bit words, respectively.

Further details of existing implementations to support SHA algorithms on certain computing architectures may be found in the publication entitled "Intel® SHA Extensions, New Instructions Supporting the Secure Hash Algorithm on Intel® Architecture Processors" (Intel is a registered trademark of Intel corporation), published July 2013.

SUMMARY

Provided are a method, a system, a computer program product, an Application Specific Integrated Circuit (ASIC), and a cryptographic module, where a partitioning is performed of a SHA-2 state update into three blocks. A set of operations associated with the three blocks are executed in a pipelined manner, where each block feeds back for computation into itself.

In certain embodiments a SHA-2 hash is performed on an input message, where the method further comprises: providing for a calculation round a first 1-cycle loop for computing a first half of working variables (A-D); providing for the calculation round a second 1-cycle loop for computing a second half of working variables (E-H); providing for the calculation round a third 1-cycle loop for providing a temporary word; and repeating computations for a specified total number of calculation rounds.

In additional embodiments the first 1-cycle loop of a computing cycle (A') runs concurrently with the second 1-cycle loop of a subsequent computing cycle (E') and the third 1-cycle loop of a subsequent computing cycle.

In yet additional embodiments, a first feedback loop provides a value of a working variable D to the first 1-cycle loop by referring to the value of a working variable A that precedes the working variable D by 3 cycles.

In yet further embodiments, a second feedback loop provides a value of a working variable H to the second 1-cycle loop by referring to a value of a working variable F that precedes the working variable H by 2 cycles.

BRIEF DESCRIPTION OF THE DRAWINGS

Referring now to the drawings in which like reference numbers represent corresponding parts throughout.

DETAILED DESCRIPTION

Figure 1:
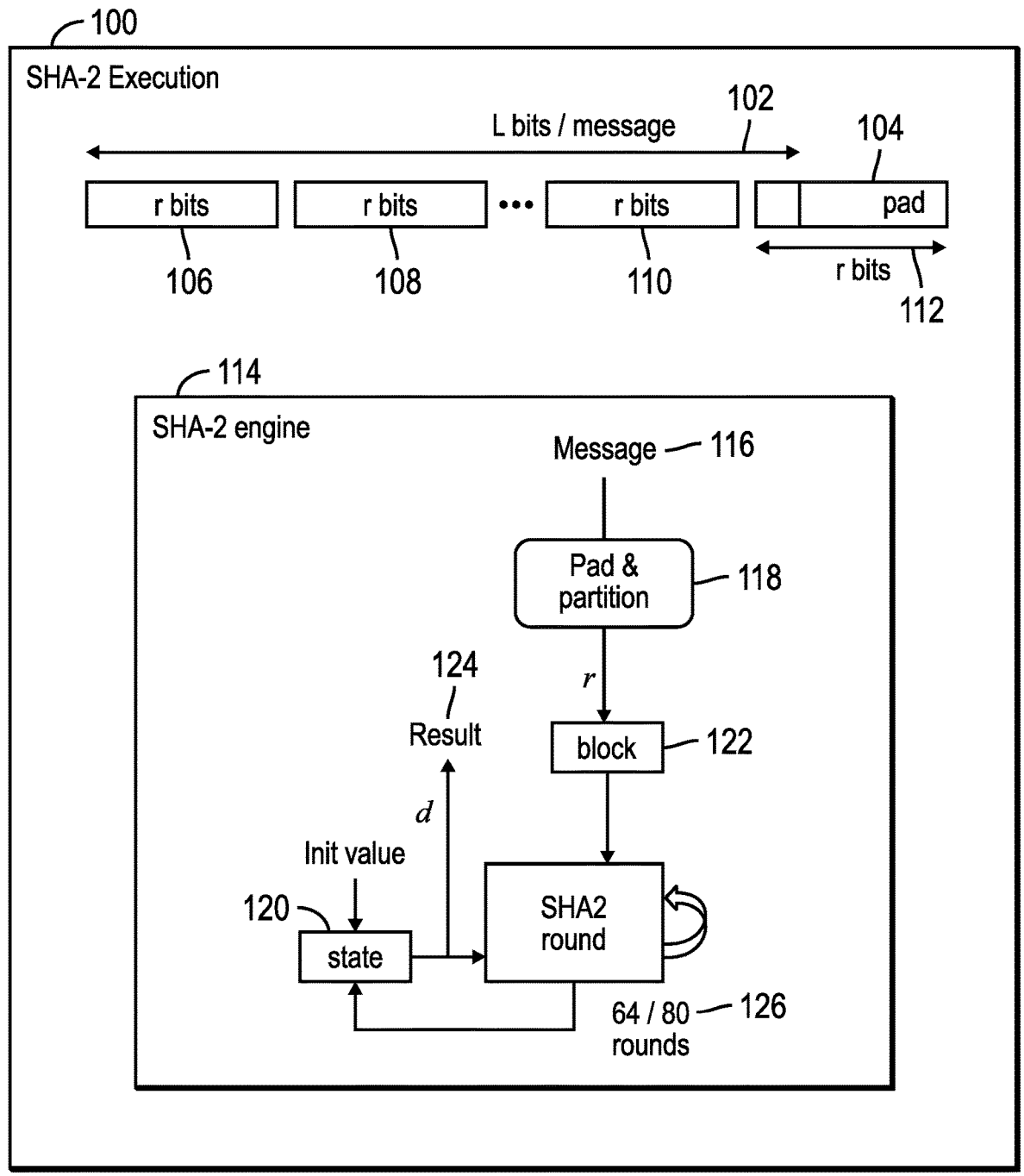
FIG. 1 illustrates a block diagram that shows SHA-2 execution, in accordance with certain embodiments.

In the following description, reference is made to the accompanying drawings which form a part hereof and which illustrate several embodiments. It is understood that other embodiments may be utilized and structural and operational changes may be made. Several examples will now be provided to further clarify various embodiments of the present disclosure.

Example 1: A method in which a partitioning is performed of a SHA-2 state update into three blocks. A set of operations associated with the three blocks are executed in a pipelined manner, where each block feeds back for computation into itself. As a result, a higher throughput data flow takes place for a SHA-2 hashing module in comparison to prior art.

Example 2: The limitations of any of Examples 1 and 3-5, where a SHA-2 hash is performed on an input message, where the method further comprises: providing for a calculation round a first 1-cycle loop for computing a first half of working variables (A-D); providing for the calculation round a second 1-cycle loop for computing a second half of working variables (E-H); providing for the calculation round a third 1-cycle loop for providing a temporary word; and repeating computations for a specified total number of calculation rounds. As a result, three 1-cycle loops are used for higher throughput data flow for a SHA-2 hashing module in comparison to prior art.

Example 3: The limitations of any of Examples 1-2 and 4-5, where the first 1-cycle loop of a computing cycle (A') runs concurrently with the second 1-cycle loop of a subsequent computing cycle (E') and the third 1-cycle loop of a subsequent computing cycle. As a result, concurrent 1-cycle loops are used for higher throughput data flow for a SHA-2 hashing module in comparison to prior art.

Example 4: The limitations of any of Examples 1-3 and 5, where a first feedback loop provides a value of a working variable D to the first 1-cycle loop by referring to the value of a working variable A that precedes the working variable D by 3 cycles. As a result, a first feedback loop is used for higher throughput data flow for a SHA-2 hashing module in comparison to prior art.

Example 5: The limitations of any of Examples 1-4, where a second feedback loop provides a value of a working variable H to the second 1-cycle loop by referring to a value of a working variable F that precedes the working variable H by 2 cycles. As a result, a second feedback loop is used for higher throughput data flow for a SHA-2 hashing module in comparison to prior art.

Example 6: A system, comprising a memory, and a processor coupled to the memory, where the processor performs operations, the operations comprising performing a method according to any one of Examples 1-5. As a result, a higher throughput data flow takes place for a SHA-2 hashing module in comparison to prior art.

Example 7: A computer program product, the computer program product comprising a computer readable storage medium having computer readable program code embodied therewith, the computer readable program code when executed is configured to perform operations, the operations comprising performing a method according to any of Examples 1-5. As a result, a higher throughput data flow takes place for a SHA-2 hashing module in comparison to prior art.

Example 8: An application specific integrated circuit (ASIC), comprising: first circuitry configured for partitioning a Secure Hash Algorithm 2 (SHA-2) state update into three blocks; and second circuitry configured for executing, in a pipelined manner, a set of operations associated with the three blocks, where each block feeds back for computation into itself, and where the ASIC performs operations comprising performing a method according to any of Examples 1-5. As a result, a higher throughput data flow takes place for a SHA-2 hashing module in comparison to prior art.

Example 9: A cryptographic module, comprising: means for partitioning a Secure Hash Algorithm 2 (SHA-2) state update into three blocks; and means for executing, in a pipelined manner, a set of operations associated with the three blocks, where each block feeds back for computation into itself. The cryptographic module further performs operations comprising performing a method according to any one of Examples 1-5. As a result, a higher throughput data flow takes place for a SHA-2 hashing module in comparison to prior art.

Users of computing systems may be highly security conscious, and cryptographic capability is a major part of security. Bulk data moving with signature or digest may currently use SHA-2. For example, blockchain uses hashing schemes like SHA-2. Good hardware acceleration is desirable for efficient implementation of SHA-2 algorithms. Performance improvements may also be desired in software or firmware implementations.

FIG. 1 illustrates a block diagram 100 that shows SHA-2 execution, in accordance with certain embodiments.

In SHA-2 execution a message 102 gets padded 104, then partitioned in blocks of r bits 106, 108,110, 112. The block size is 16 words.

The operations of a SHA-2 engine are shown in FIG. 1 (via reference numeral 114). A message 116 is received and then padded and partitioned (reference numeral 118).

The SHA-2 reads the 8-word state 120 and a 16-word message block 122, iterates on it for 64 or 80 rounds (reference numeral 126), and produces the new state. There are data dependencies between rounds through the state produced or consumed by the SHA-2 engine. The state is the value of a specific variable after each iteration. The result 124 is obtained from the last state. The number of rounds and word width depends on the SHA-2 flavors. The result 124 is the state after 64 or 80 depending on the number of iterations, where a new state is produced from the previous state. It may be noted that SHA-224 and SHA-256 have 32b word size and 64 rounds and SHA-384 and SHA-512 have 64b word size and 80 rounds.

Figure 2:
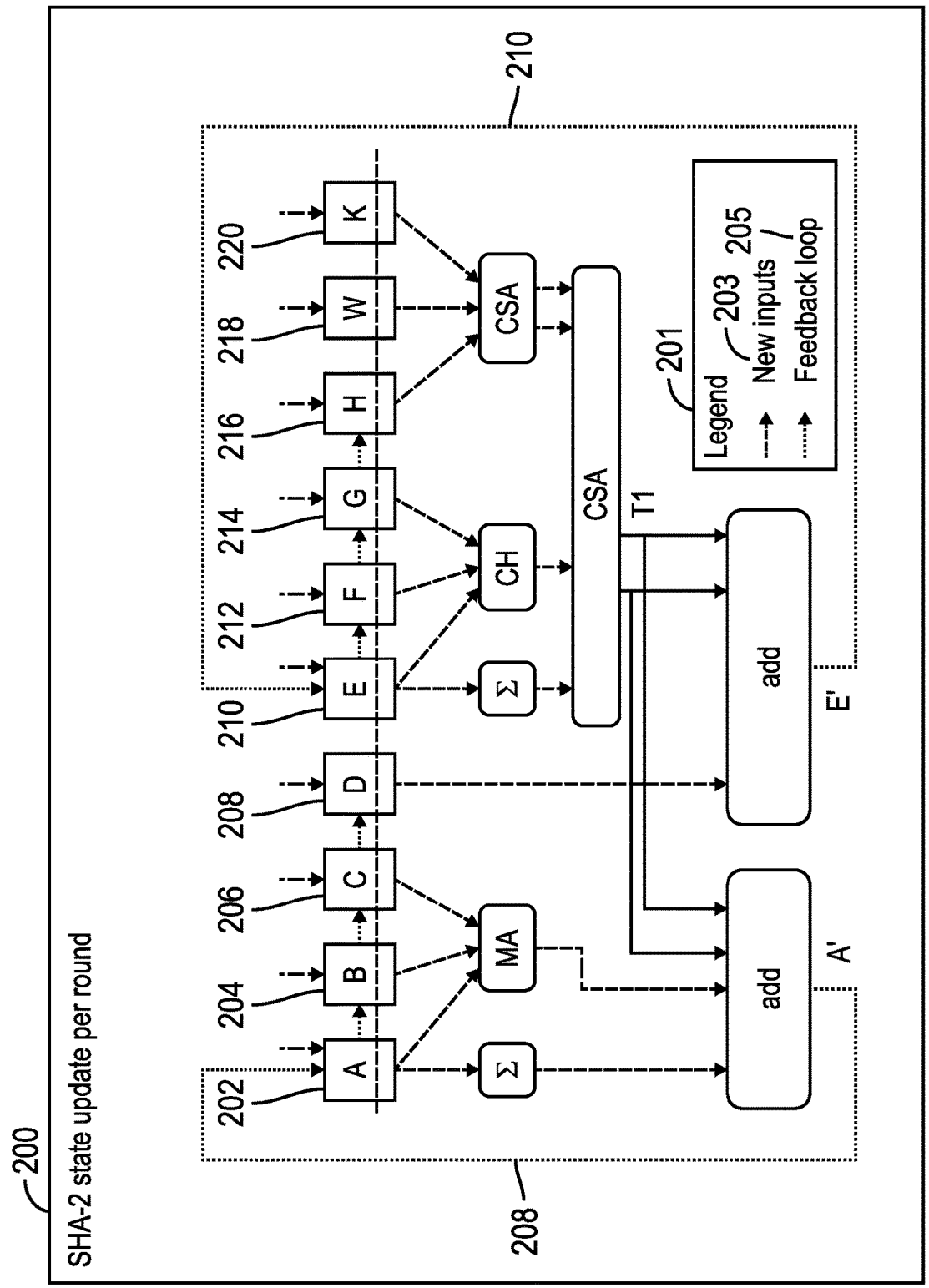
FIG. 2 illustrates a block diagram that shows SHA-2 state update per round, in accordance with certain embodiments.

FIG. 2 illustrates a block diagram 200 that shows SHA-2 state update per round, in accordance with certain embodiments. The legend 201 shows how new inputs 203 and how the feedback loop 205 are indicated in FIG. 2.

It may be noted that A, B, C, D, E, F, G, and H (shown via reference numerals 202, 204, 206, 210, 212, 214, 216) are working variables whereas W 218 and K 220 comprise the message and key respectively. The feedback loop in FIG. 2 is shown via reference numerals 208 and 210.

In FIG. 2, the working variables A, B, C, D, E, F, G, and H (reference numerals 202, 204, 296, 208, 210, 212, 214, 216) comprise an 8-word state, where a word is 32b or 64b. K 220 is a round specific key and these are 64 or 80 constants for SHA-256 and SHA-512 respectively. W 220 is message word for round t, derived from the 16-word message block by the message schedule.

Message schedule function is less timing critical, because the function is simpler and can be spread across two cycles. In a straight-forward hardware implementation, solutions are optimized for latency of a single round. At 4-5 GHz, compute for 1 round requires approximately 1.5 cycles and the solution requires a 2-cycle design (or half frequency). In another solution the hardware is optimized for latency of 2 rounds in 3 cycles.

One of the goals is to accelerate a SHA-2 round for the processing of an entire message block (multiple rounds) for high frequency processor cores. It is desirable to have a throughput of 1 round per cycle (i.e., 80 cycles for 80 rounds). The cost of the straightforward implementation needs to be reduced.

In the prior art, there are several specialty cryptographic modules which address throughput (e.g., Publication entitled "Ultra-High Speed SHA-256 Hashing Cryptographic Module for IPSEC Hardware/Software Codesign" downloaded from https://www.scitepress.org/papers/2010/29914/29914.pdf). A common theme is to run two or even more messages in lockstep. That increases the parallelism and allows for deeper pipelining of an engine when interleaving the messages, and multiple parallel engines for parallel streams. In this scenario, the latency of a single round or of one message block is of less importance, and the key is the throughput for many messages.

In the server context, open-source crypto libraries like OpenSSL and Nettle play a major role. Their Application Programming Interface (API) does not support the lockstep mode but supports one message at a time. The drawback is that running two messages in lock-step is not applicable to most cryptographic API's used in the processor context.

Certain processing systems have hardware support for a building block (sigma functions) of the state update and message schedule and require several instructions per round, including about 10 cycles per round on one system (About 800 cycles for 80 rounds). It is slower than the desired one cycle per round.

In the straightforward implementation of the state update function requires at high frequency (4-5 GHz) more than one cycle. With overhead for result forwarding, 2 to 3 cycles per round are needed. In the best case 160 cycles are needed for 80 rounds. The hardware cost is optimal, but it is slower than the desired one cycle per round.

A currently known solution for processors is described in the publication entitled "Intel SHA Extensions, New Instructions Supporting the Secure Hash Algorithm on Intel Architecture Processors", published July 2013, and U.S. Pat. No. 10,346,343 B2 (includes a 2-round trick). It is observed that the state update can be processed more efficiently at a granularity of 2 rounds per instruction. A vector support instruction which performs two rounds of the state update for the 32b flavors of SHA-2 is provided. It reduces the forwarding overhead, so that 2 rounds can be fitted in 3 cycles (at 4-5 GHz). With amortization and with inter unit result forwarding. 1.5-2 cycles per round are needed. In the best case 120 cycles are needed for 80 rounds. However, it requires twice the hardware of a straightforward solution.

The publication entitled "Ultra-High Speed SHA-256 Hashing Cryptographic Module for IPSEC Hardware/Software Codesign" (downloaded from https://www.scitepress.org/papers/2010/29914/29914.pdf) includes a solution for a specialty device, optimized for high throughput for many concurrent messages. It has two main ideas: (1) Lockstep of two messages, to fully exploit a two-cycle pipeline and not applicable for Central Processing Unit (CPU) use; and (2) Hardware optimized for 2 rounds in 2 cycles. It is applicable to processors with 2-round instruction (Intel) or multi-round instructions. It is optimized for Field-programmable gate array (FPGA) but not for chip technology. Thus, the idea behind the design can be applied to a processor solution but the design itself needs to be adjusted and optimized for a high-frequency processor design. The drawback is too much hardware, and it is slower than the embodiments proposed in this this disclosure.

Figure 3:
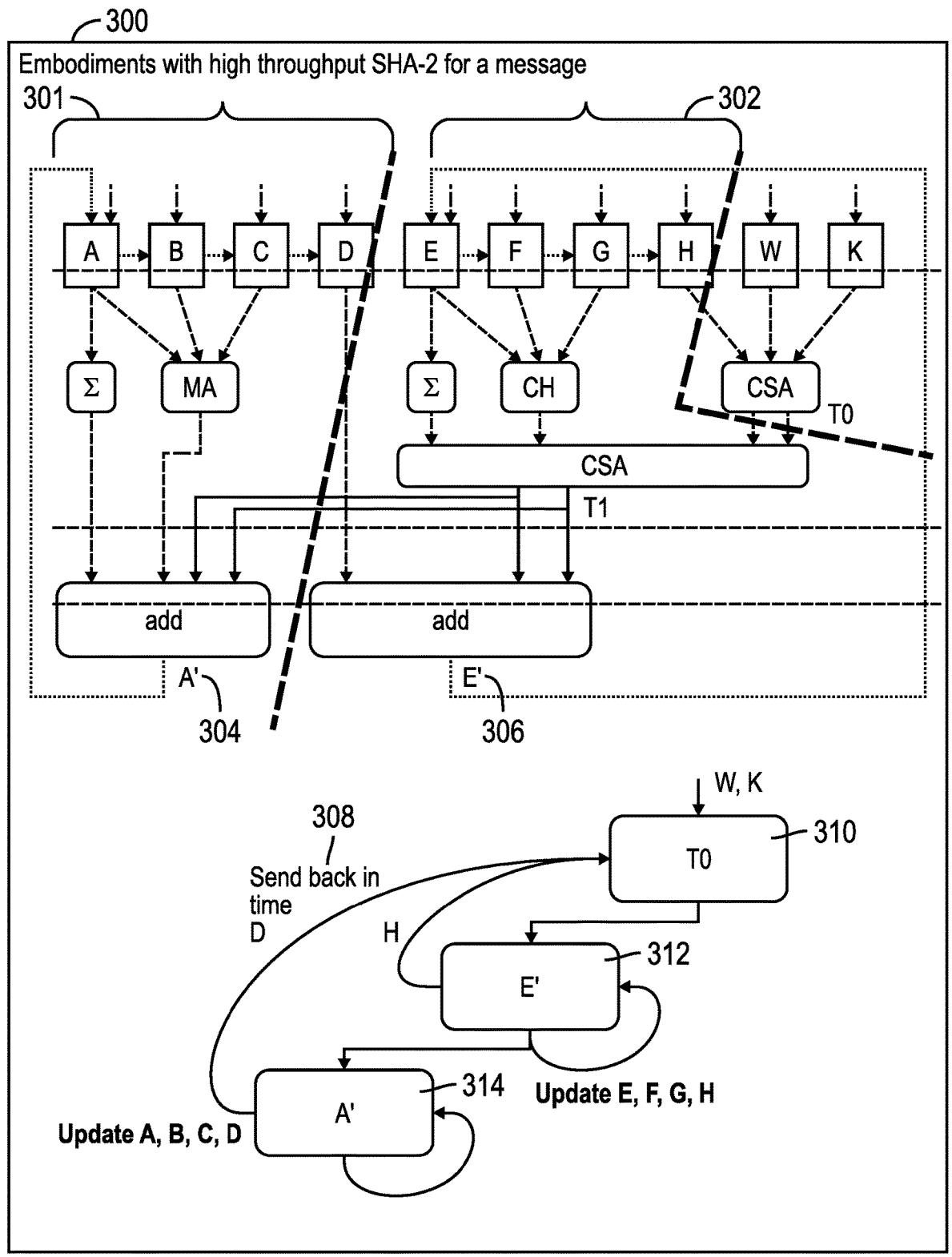
FIG. 3 illustrates a block diagram that shows embodiments with high throughput SHA-2 for a message, in accordance with certain embodiments.

FIG. 3 illustrates a block diagram 300 that shows embodiments with high throughput SHA-2 for a message, in accordance with certain embodiments.

Certain embodiments target the processing of an entire message block and not just the processing of one or two rounds. It optimizes the execution for throughput. i.e., the latency for the processing of an entire message block rather than the latency of a round or two rounds.

Such embodiments, partitions the SHA-2 state update function into a 3-cycle pipeline with two one-cycle loops, and some preprocessing. The preprocessing and the two loops are coupled by forward and backward data transfer. The backward data transfer (1 to 2 cycles back in time) is made possible by the shift-register nature of the state update function. It requires special handling when starting the processing of the next message block.

In the embodiments shown in FIG. 3, a SHA-2 hash is performed on an input message. The operations provide for a calculation round a first 1-cycle loop for computing the first half of working variables (A-D) 301. The operations also provide for the calculation round a second 1-cycle loop for computing a second half of working variables (E-H) 302.

The operations further provide for the calculation round, a third 1-cycle loop for providing a temporary word. The computations are repeated for a specified total number of calculation rounds.

Certain embodiments allow to iterate at 1-cycle per round even for high frequencies of 4-5 GHz with very little extra hardware compared to a base design (straightforward implementation). That way, it achieves: (1) higher performance at the same amount of hardware than the area efficient base design (e.g.: 82 cycles for 80 rounds and not the 160 cycles of the base design); and (2) same performance with much less chip area and power than specialty chip solutions optimized for high throughput.

In certain embodiments, the first 1-cycle loop of a computing cycle (A') 304 runs concurrently with the second 1-cycle loop of a subsequent computing cycle (E') 306 and the third 1-cycle loop of a subsequent computing cycle.

A first feedback loop 304 provides a value of a working variable D to the first 1-cycle loop by referring to the value of the working variable A that precedes the working variable D by 3 cycles. A second feedback loop 306 provides a value of a working variable H to the second 1-cycle loop by referring to a value of a working variable E that precedes the working variable H by 2 cycles. The "sending back in time" 308 shown in FIG. 3 illustrates these operations. "Sending back in time" is a paradigm that is implemented in certain embodiments, because A B C D form a shift register.

Thus, the embodiments provide three interlocked, 1-cycle loops comprising:

1) "Pipelining" of the compute: T0 to E' to A' (310, 312, 314); and
2) Requires sending data "back-in-time".

The embodiments provide a throughput of 1 round/cycle at 4-5 GHz with a two times speedup. There is a higher throughput, including throughput/watt and throughput/area.

Figure 4A:
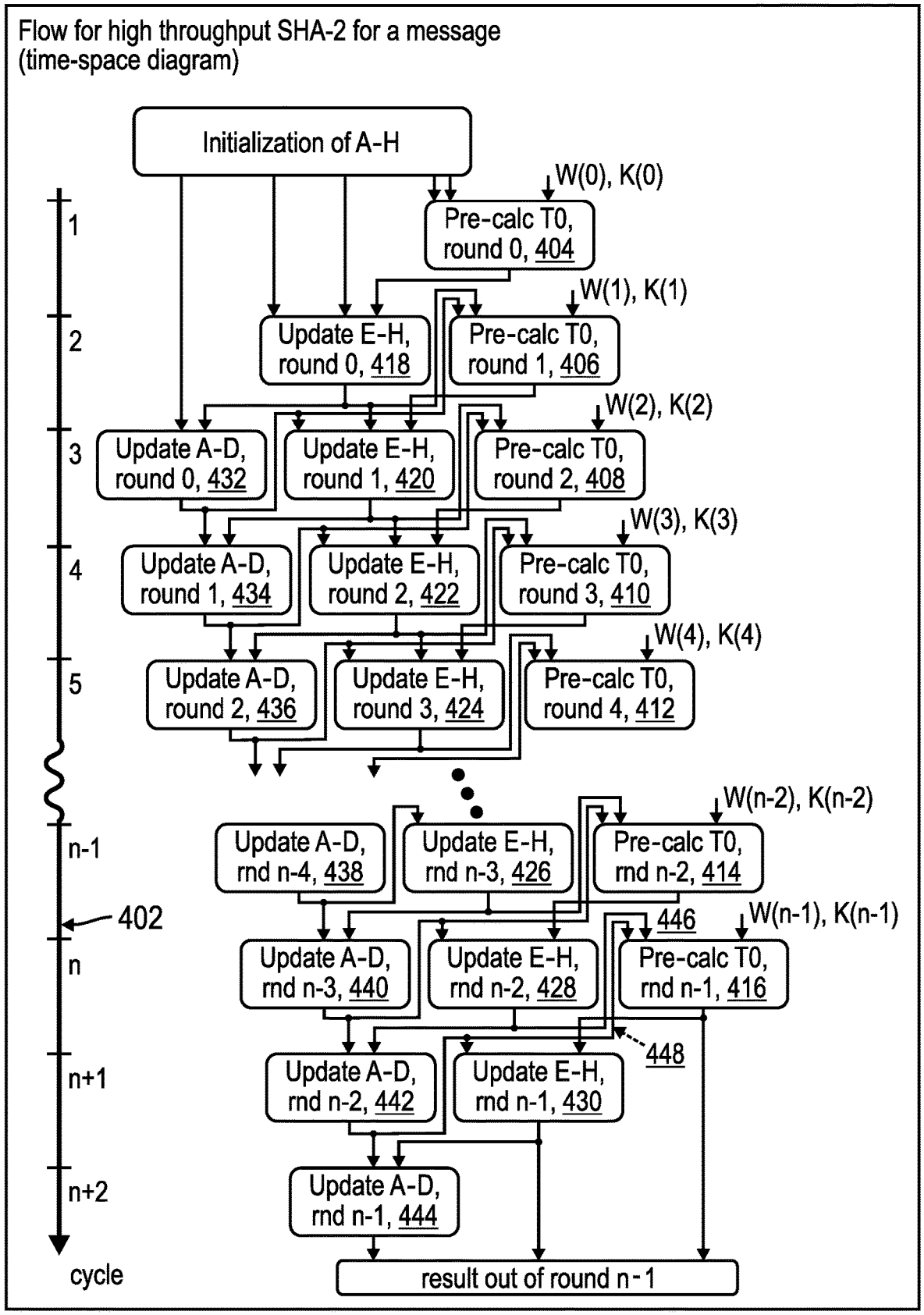
FIG. 4A illustrates a block diagram that shows the flow for high throughput SHA-2 for a message, in accordance with certain embodiments.
Figure 4B:
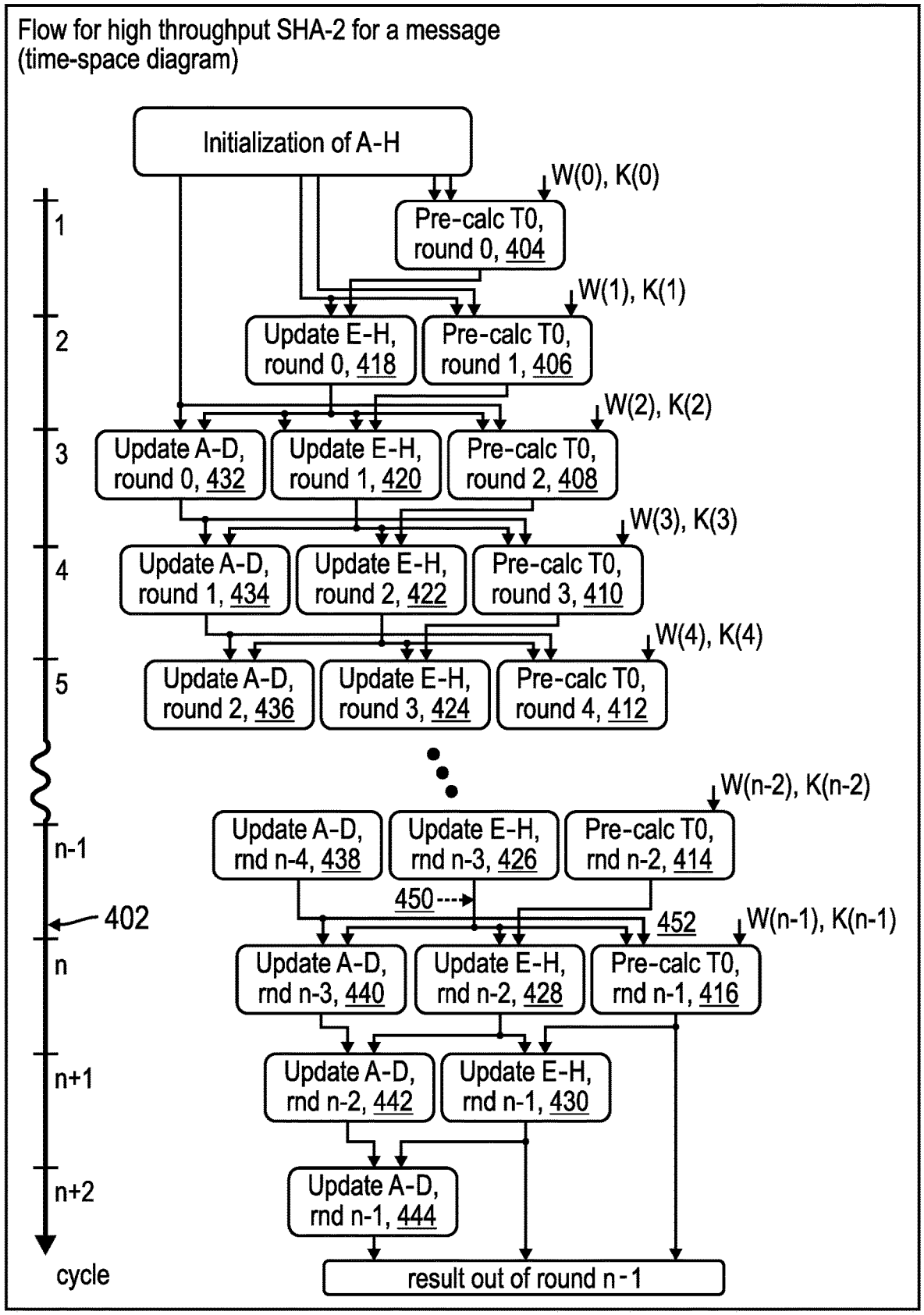
FIG. 4B illustrates a block diagram that shows the flow for high throughput SHA-2 for a message, in accordance with certain embodiments.

FIG. 4A and FIG. 4B illustrate block diagrams that show the flow for high throughput SHA-2 for a message, in accordance with certain embodiments. FIG. 4A and FIG. 4B may be said to depict time-space diagrams. The elapse of time is shown via the arrow 402 and the pipelining of the compute from T0 to E' to A' is shown in FIG. 4A at different times as blocks 404, 406, 408, 410, 412, 414, 416, 418, 420, 422, 424, 426, 428, 430, 432, 434, 436, 438, 440, 442, and 444. The arrows going back in time, 446 and 448 being two such illustrative arrows emanating from blocks 428 round n−2 and block 442 round n−2 respectively, indicates the back-in-time arrow 308 of FIG. 3. The embodiments achieve this back-in-time feature by taking the value indicated by the back-arrows 446 and 448 from an earlier iteration of these blocks as illustrated in FIG. 4B. In FIG. 4B, arrow 446 has been replaced by arrow 450 now emanating from block 426 round n−3, and arrow 448 has been replaced by arrow 452 now emanating from block 438 round n−4.

Figure 5:
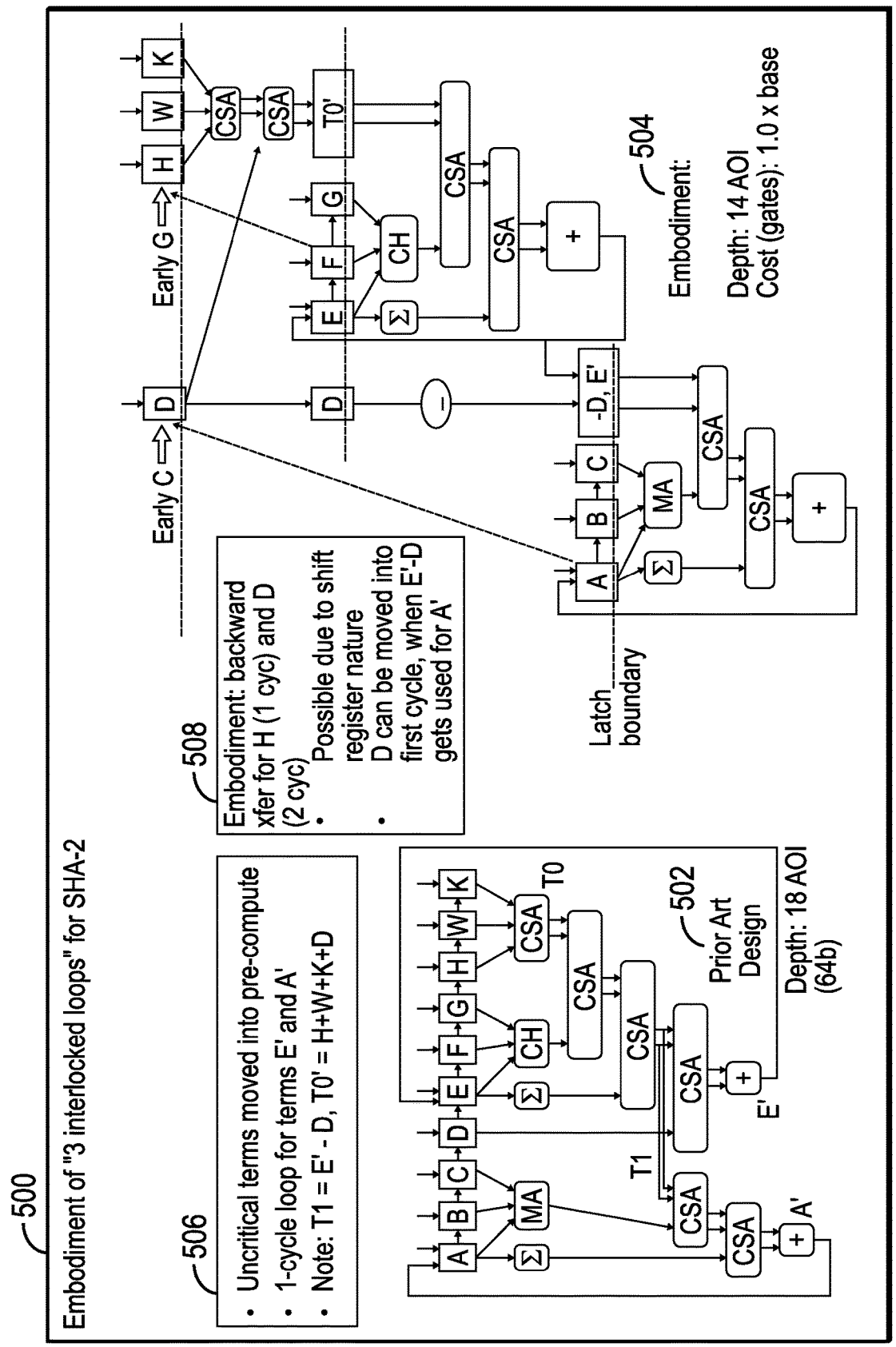
FIG. 5 illustrates a block diagram that shows an embodiment of three pipelined loops for SHA-2, in accordance with certain embodiments.

FIG. 5 illustrates a block diagram 500 that shows an embodiment of three pipelined loops for SHA-2, in accordance with certain embodiments. A prior art design is shown (reference numeral 502) on the left and an embodiment of the invention (reference numeral 504) on the right.

In FIG. 5, the uncritical terms are moved into pre-compute. 1-cycle loop is present for terms E' and A', where T1=E'−D, T0'=H+W+K+D (reference numeral 506).

A key part is backward transfer for H (1 cycle) and D (2 cycle). This is possible due to the shift register nature. For example, D can be moved into first cycle, when E'−D gets used for A'. This is shown via reference numeral 508.

Figure 6:
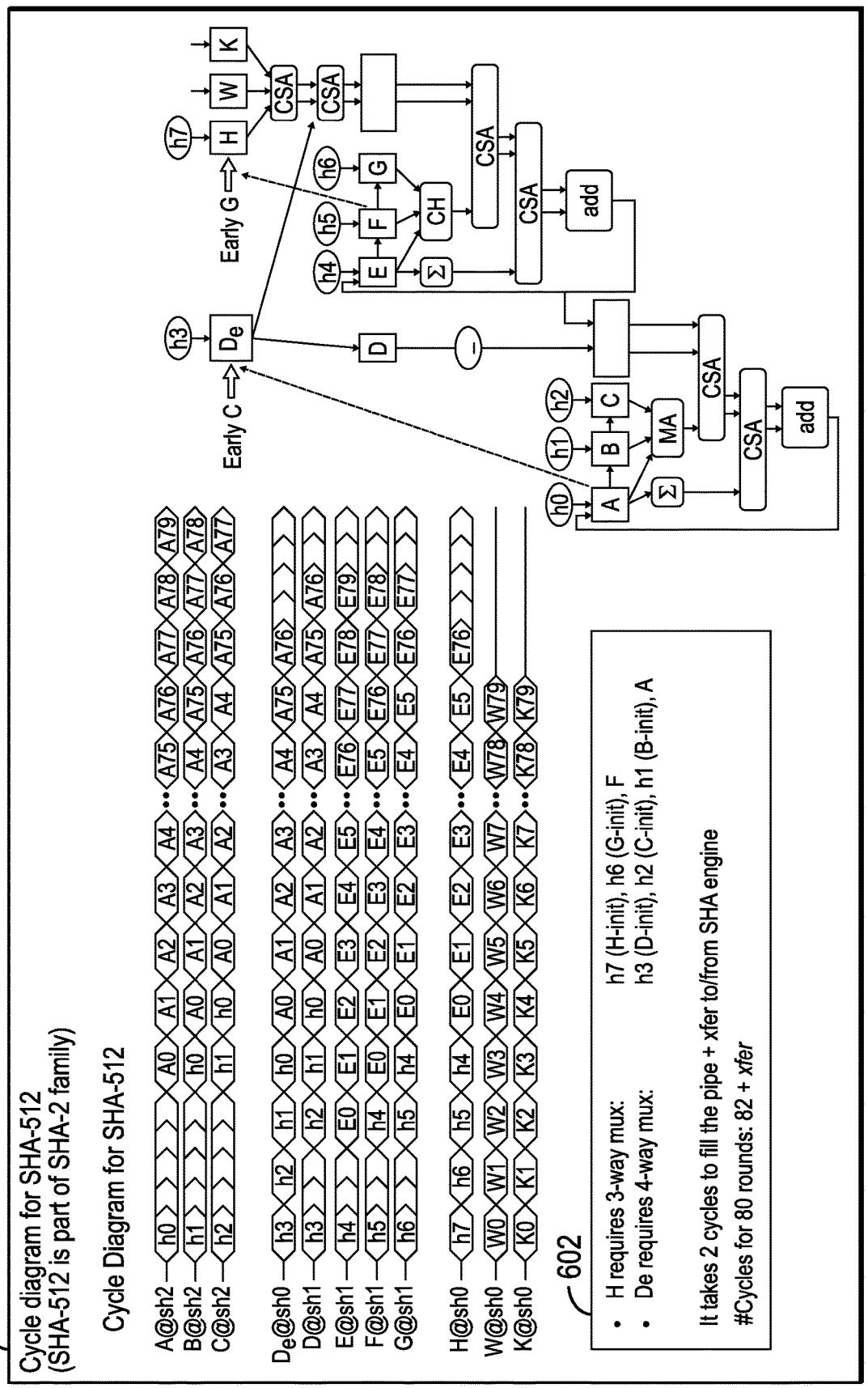
FIG. 6 illustrates a block diagram of a cycle diagram for SHA-512 of the SHA-2 family, in accordance with certain embodiments.

FIG. 6 illustrates a block diagram 600 of a cycle diagram for SHA-512 of the SHA-2 family, in accordance with certain embodiments.

It takes 2 cycles to fill the pipe and transfer to/from SHA-2 engine. The number of cycles for 80 rounds in certain embodiments may be 82+transfer cycles which may be 87 on a first type of processor vs. 160 on a second type of processor (this is shown via reference numeral 602).

Figure 7:
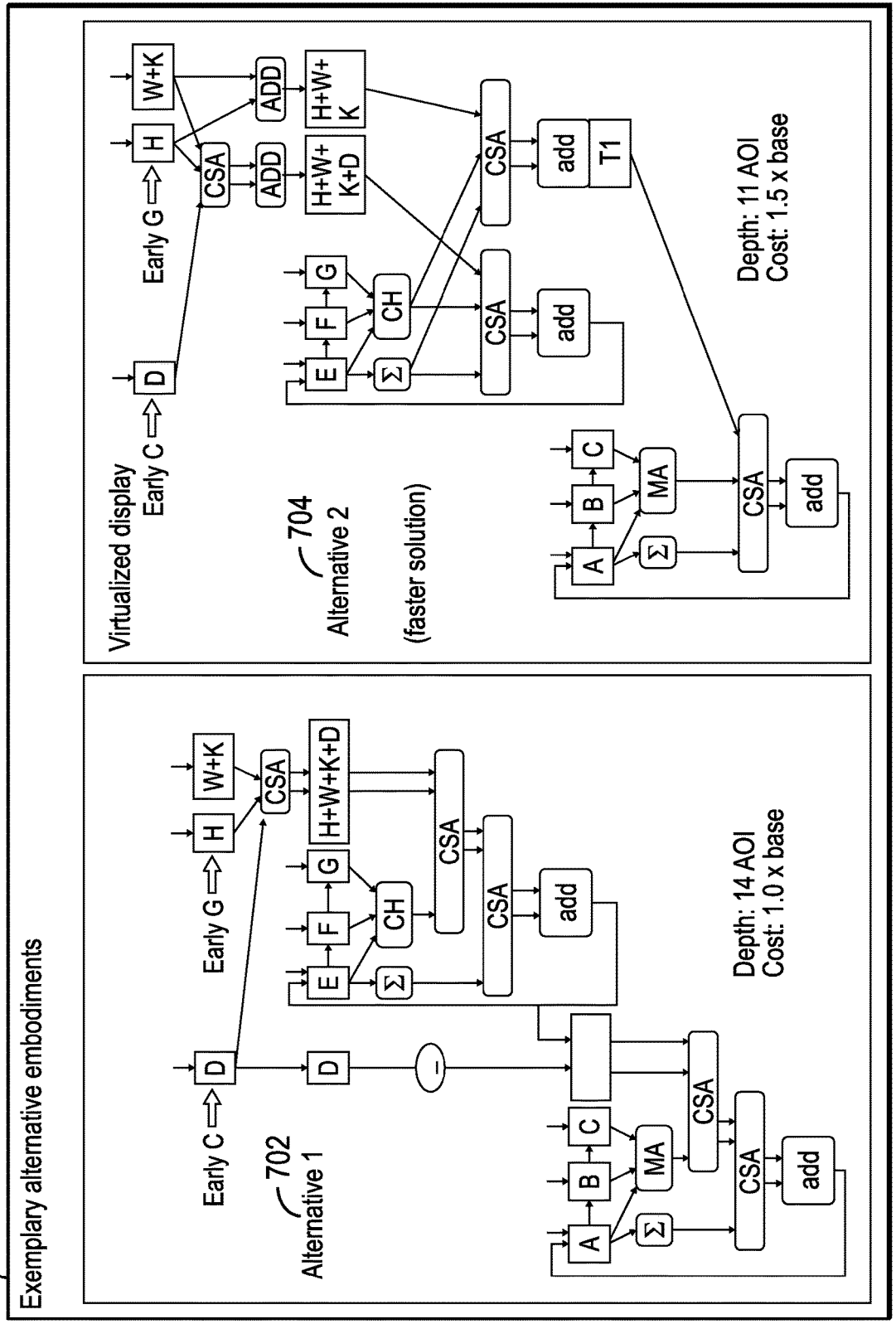
FIG. 7 illustrates a block diagram that shows exemplary alternative embodiments, in accordance with certain embodiments.

FIG. 7 illustrates a block diagram 700 that shows exemplary alternative embodiments, in accordance with certain embodiments. Two embodiments referred to via reference numerals 702 ("Alternative 1") and 704 ("Alternative 2") are shown in FIG. 7. "Alternative 2" embodiment performs faster than the "Alternative 1" embodiment.

Figure 8A:
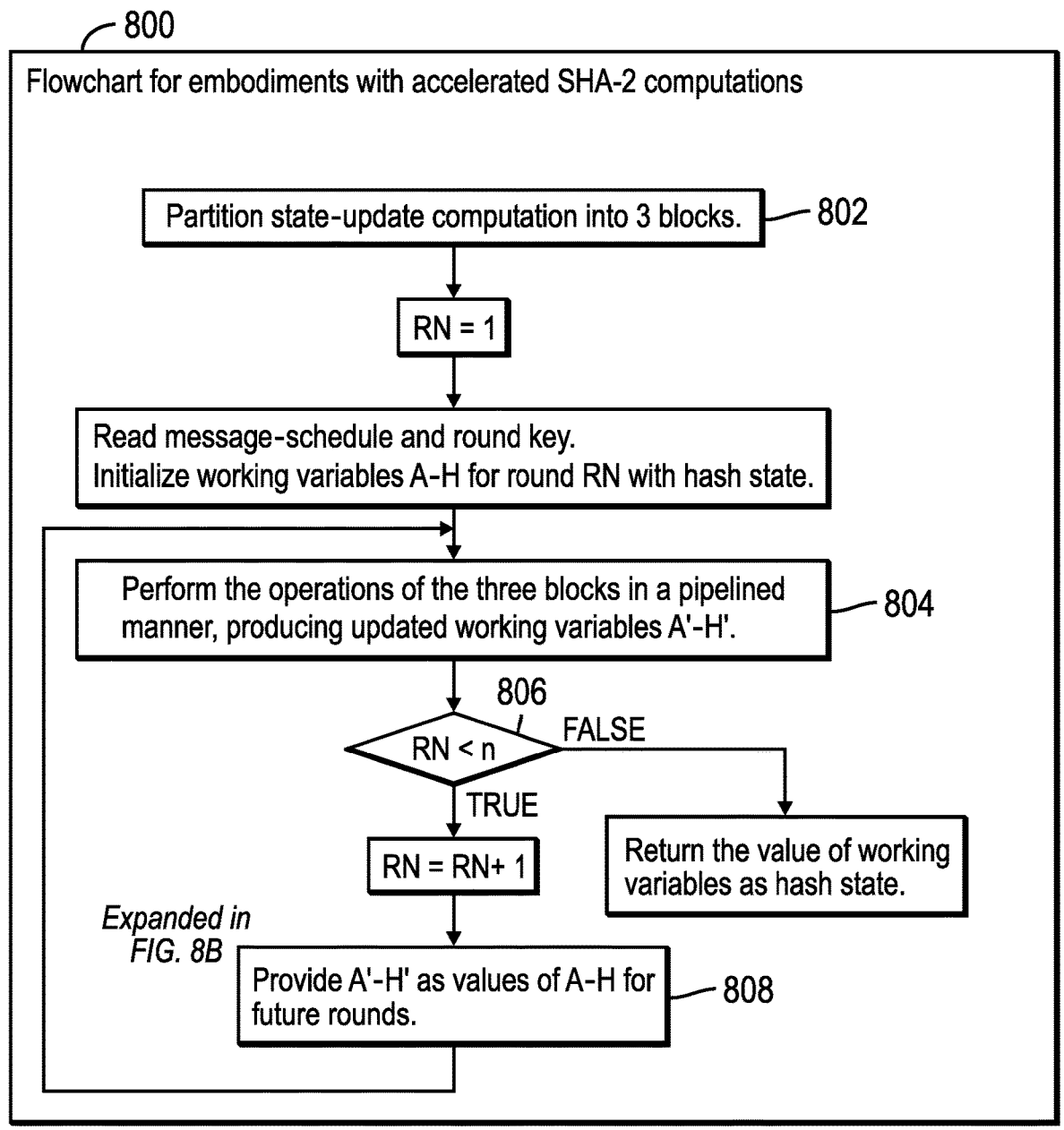
FIG. 8A illustrates a flowchart for embodiments with accelerated SHA-2 computations, in accordance with certain embodiments.

FIG. 8A illustrates a flowchart 800 for embodiments with accelerated SHA-2 computations, in accordance with certain embodiments.

Control starts at block 802 where a partitioning is performed of a SHA-2 state update into three blocks. A set of operations associated with the three blocks are executed (at block 804) in a pipelined manner, where each block feeds back for computation into itself, as shown in block 808 (block 808 is further expanded in FIG. 8B). The value of n in block 806 is 64 for SHA-256 and 80 for SHA-512. The value of n determines the number of rounds performed on a message block.

Figure 8B:
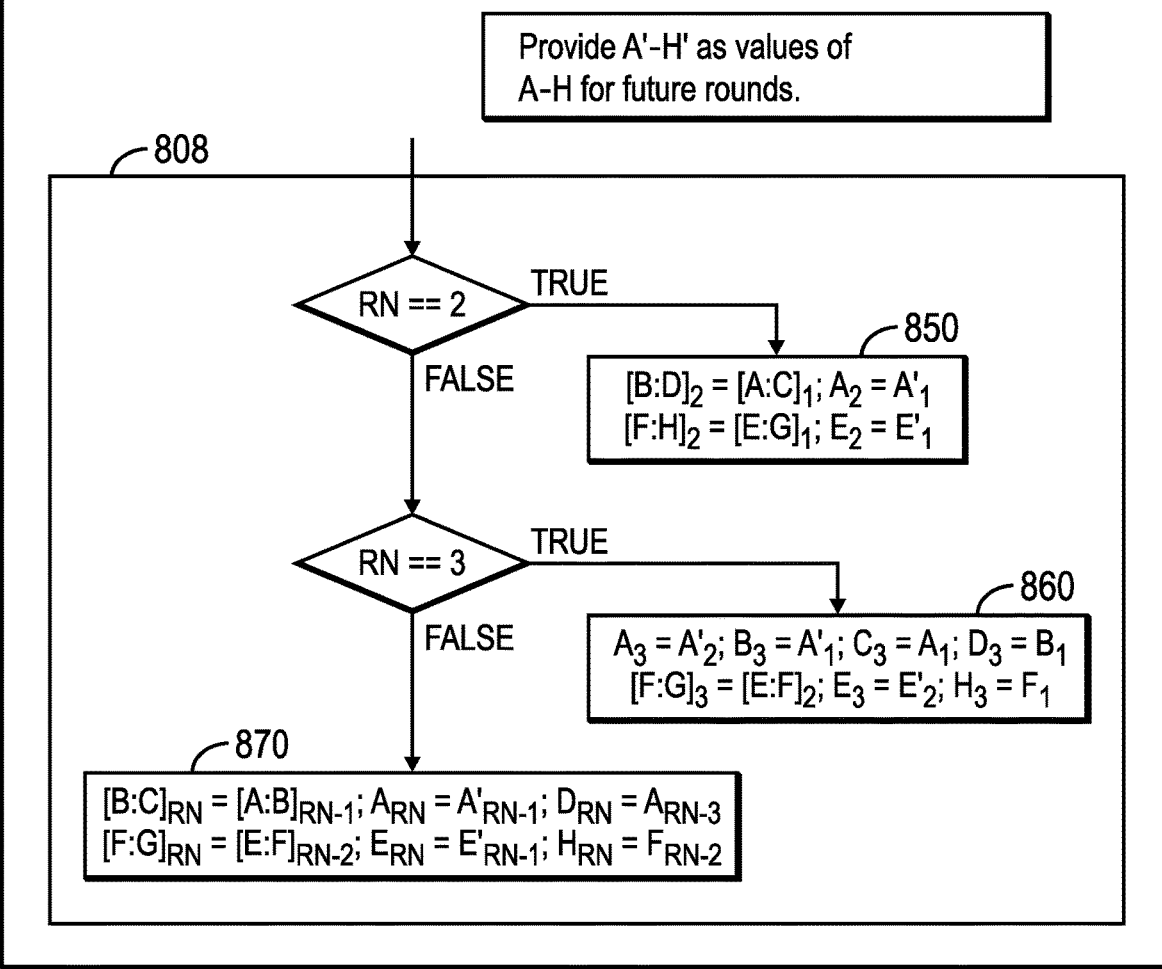
FIG. 8B illustrates a flowchart for embodiments with accelerated SHA-2 computations, in accordance with certain embodiments.

FIG. 8B describes the propagation of working variables D and H, specifically it being obtained from a copy of the working variable A three iterations earlier when RN is greater than 3, as shown in block 870. Blocks 850 and 860 show the handling for RN less than 4. Similarly, the blocks 850, 860, 870 also illustrate the propagation of the working variable H, specifically it being obtained from a copy of the working variable F two iterations earlier when RN is greater than 2.

Figure 9:
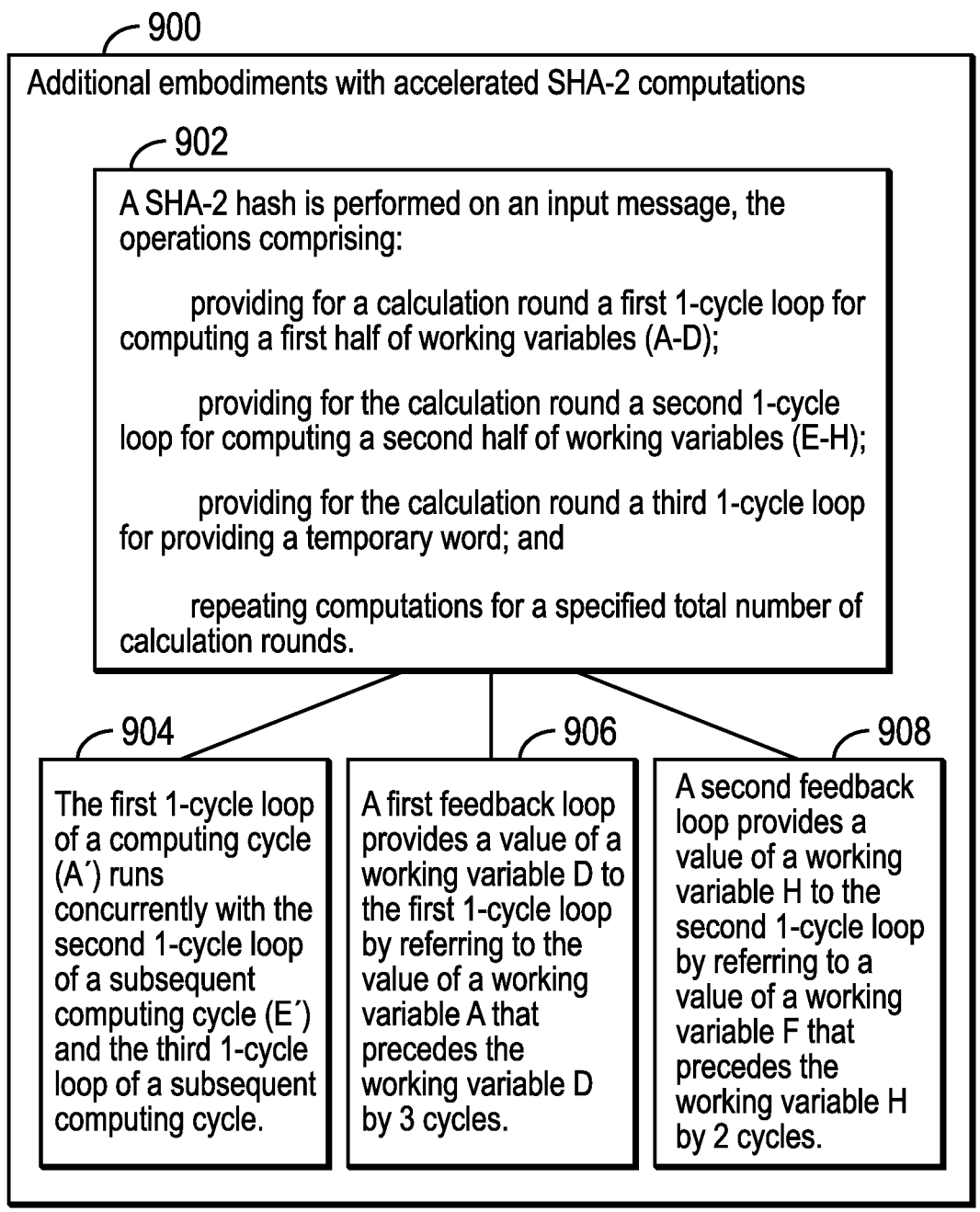
FIG. 9 shows additional embodiments with accelerated SHA-2 computations.

FIG. 9 shows a block diagram 900 of additional embodiments with accelerated SHA-2 computations.

In certain embodiments (shown via reference numeral 902) a SHA-2 hash is performed on an input message, where the method further comprises: providing for a calculation round a first 1-cycle loop for computing a first half of working variables (A-D); providing for the calculation round a second 1-cycle loop for computing a second half of working variables (E-H); providing for the calculation round a third 1-cycle loop for providing a temporary word; and repeating computations for a specified total number of calculation rounds.

In additional embodiments shown via reference numeral 904, the first 1-cycle loop of a computing cycle (A') runs concurrently with the second 1-cycle loop of a subsequent computing cycle (E') and the third 1-cycle loop of a subsequent computing cycle.

In yet additional embodiments shown via reference numeral 906, a first feedback loop provides a value of a working variable D to the first 1-cycle loop by referring to the value of a working variable A that precedes the working variable D by 3 cycles.

In yet further embodiments shown via reference numeral 908, a second feedback loop provides a value of a working variable H to the second 1-cycle loop by referring to a value of a working variable F that precedes the working variable H by 2 cycles.

Therefore, FIGS. 1-9 illustrate embodiments for improved implementations of SHA-2.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 10:
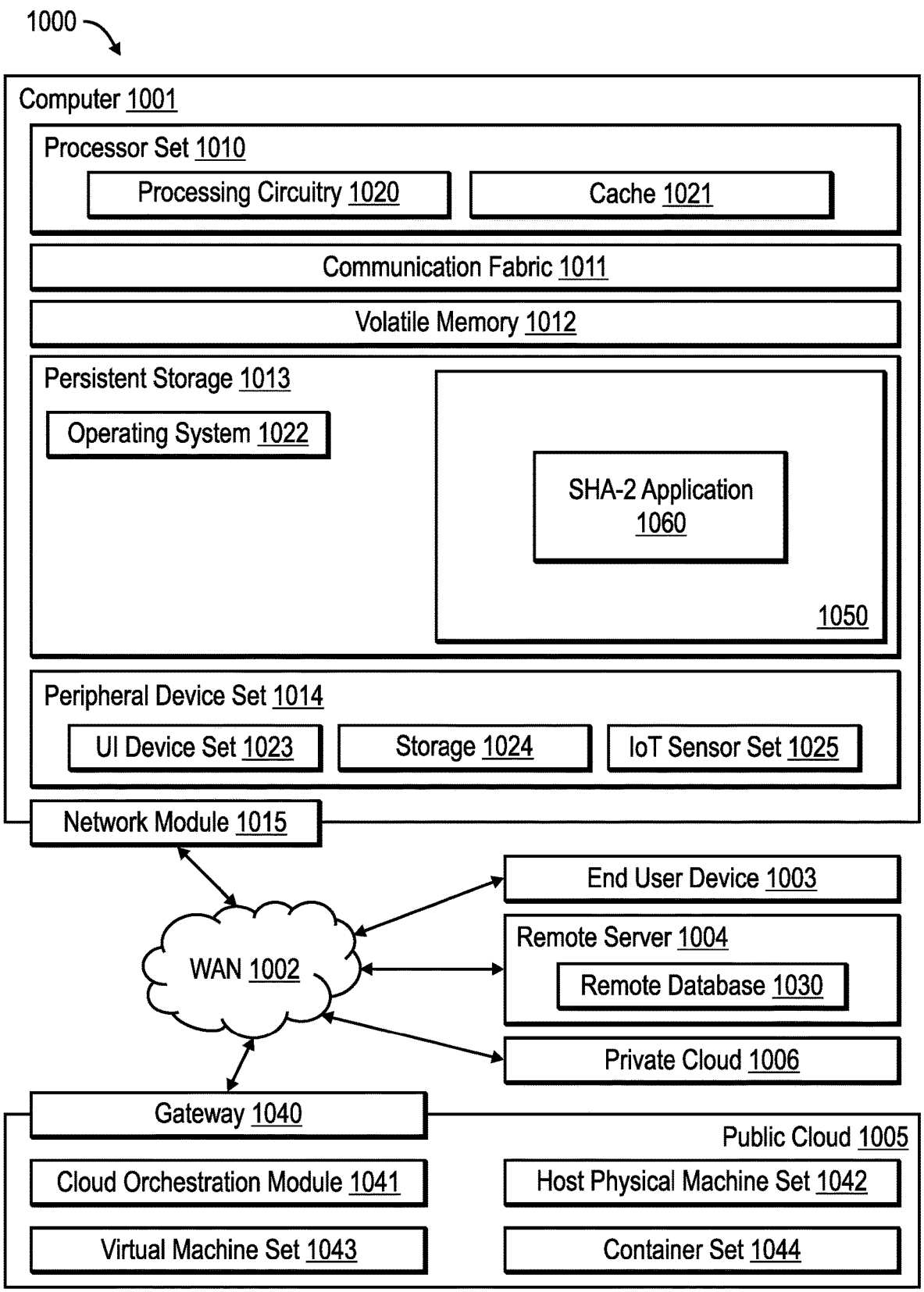
FIG. 10 illustrates a computing environment in which certain components may be implemented, in accordance with certain embodiments.

In FIG. 10, computing environment 1000 contains an example of an environment for the execution of at least some of the computer code (block 1050) involved in performing the operations of a SHA-2 application 1060 that performs operations of embodiments shown in FIGS. 1-9.

In addition to block 1050, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1050, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1050 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid-state storage devices. Operating system 1022 may take several forms, such as various known proprietary operating systems or open-source Portable Operating System Interface-type operating systems that employ a kernel. The code included in block 1050 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. I/O T sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
   partitioning a Secure Hash Algorithm 2 (SHA-2) state update into three blocks,
   wherein a SHA-2 hash is performed on an input message;
   providing for a calculation round a first 1-cycle loop for computing a first half of working variables (A-D);
   providing for the calculation round a second 1-cycle loop for computing a second half of working variables (E-H);
   providing for the calculation round a third 1-cycle loop for providing a temporary word; and
   repeating computations for a specified total number of calculation rounds, wherein the first 1-cycle loop of a computing cycle (A') runs concurrently with the second 1-cycle loop of a subsequent computing cycle (E') and the third 1-cycle loop of a subsequent computing cycle, and wherein each block feeds back computation into itself.

2. The method of claim 1, wherein a first feedback loop provides a value of a working variable D to the first 1-cycle loop by referring to the value of a working variable A that precedes the working variable D by 3 cycles.

3. The method of claim 2, wherein a second feedback loop provides a value of a working variable H to the second 1-cycle loop by referring to a value of a working variable F that precedes the working variable H by 2 cycles.

4. A system, comprising:
   a memory; and
   a processor coupled to the memory, wherein the processor performs operations, the operations comprising:
   partitioning a Secure Hash Algorithm 2 (SHA-2) state update into three blocks, wherein a SHA-2 hash is performed on an input message;
   providing for a calculation round a first 1-cycle loop for computing a first half of working variables (A-D);
   providing for the calculation round a second 1-cycle loop for computing a second half of working variables (E-H);
   providing for the calculation round a third 1-cycle loop for providing a temporary word; and
   repeating computations for a specified total number of calculation rounds, wherein the first 1-cycle loop of a computing cycle (A') runs concurrently with the second 1-cycle loop of a subsequent computing cycle (E') and the third 1-cycle loop of a subsequent computing cycle, and wherein each block feeds back computation into itself.

5. The system of claim 4, wherein a first feedback loop provides a value of a working variable D to the first 1-cycle loop by referring to the value of a working variable A that precedes the working variable D by 3 cycles.

6. The system of claim 5, wherein a second feedback loop provides a value of a working variable H to the second 1-cycle loop by referring to a value of a working variable F that precedes the working variable H by 2 cycles.

7. A computer program product, the computer program product comprising a computer readable storage medium having computer readable program code embodied therewith, the computer readable program code when executed is configured to perform operations, the operations comprising:
   partitioning a Secure Hash Algorithm 2 (SHA-2) state update into three blocks, wherein a SHA-2 hash is performed on an input message;
   providing for a calculation round a first 1-cycle loop for computing a first half of working variables (A-D);
   providing for the calculation round a second 1-cycle loop for computing a second half of working variables (E-H);
   providing for the calculation round a third 1-cycle loop for providing a temporary word; and
   repeating computations for a specified total number of calculation rounds, wherein the first 1-cycle loop of a computing cycle (A') runs concurrently with the second 1-cycle loop of a subsequent computing cycle (E') and the third 1-cycle loop of a subsequent computing cycle, and wherein each block feeds back computation into itself.

8. The computer program product of claim 7, wherein a first feedback loop provides a value of a working variable D to the first 1-cycle loop by referring to the value of a working variable A that precedes the working variable D by 3 cycles.

9. The computer program product of claim 8, wherein a second feedback loop provides a value of a working variable H to the second 1-cycle loop by referring to a value of a working variable F that precedes the working variable H by 2 cycles.

10. An application specific integrated circuit (ASIC), comprising:
    first circuitry configured for partitioning a Secure Hash Algorithm 2 (SHA-2) state update into three blocks, wherein a SHA-2 hash is performed on an input message;
    second circuitry configured for providing for a calculation round a first 1-cycle loop for computing a first half of working variables (A-D);
    third circuitry configured for providing for the calculation round a second 1-cycle loop for computing a second half of working variables (E-H);
    fourth circuitry configured for providing for the calculation round a third 1-cycle loop for providing a temporary word; and
    fifth circuitry configured for repeating computations for a specified total number of calculation rounds, wherein the first 1-cycle loop of a computing cycle (A') runs concurrently with the second 1-cycle loop of a subsequent computing cycle (E') and the third 1-cycle loop of a subsequent computing cycle, and wherein each block feeds back computation into itself.

11. The ASIC of claim 10, wherein a first feedback loop provides a value of a working variable D to the first 1-cycle loop by referring to the value of a working variable A that precedes the working variable D by 3 cycles.

12. The ASIC of claim 11, wherein a second feedback loop provides a value of a working variable H to the second 1-cycle loop by referring to a value of a working variable F that precedes the working variable H by 2 cycles.

13. A cryptographic module, comprising:
- first circuitry configured for partitioning a Secure Hash Algorithm 2 (SHA-2) state update into three blocks, wherein a SHA-2 hash is performed on an input message;
- second circuitry configured for providing for a calculation round a first 1-cycle loop for computing a first half of working variables (A-D);
- third circuitry configured for providing for the calculation round a second 1-cycle loop for computing a second half of working variables (E-H);
- fourth circuitry configured for providing for the calculation round a third 1-cycle loop for providing a temporary word; and
- fifth circuitry configured for repeating computations for a specified total number of calculation rounds, wherein the first 1-cycle loop of a computing cycle (A') runs concurrently with the second 1-cycle loop of a subsequent computing cycle (E') and the third 1-cycle loop of a subsequent computing cycle, and wherein each block feeds back computation into itself.

14. The cryptographic module of claim 13, wherein a first feedback loop provides a value of a working variable D to the first 1-cycle loop by referring to the value of a working variable A that precedes the working variable D by 3 cycles.

15. The cryptographic module of claim 14, wherein a second feedback loop provides a value of a working variable H to the second 1-cycle loop by referring to a value of a working variable F that precedes the working variable H by 2 cycles.

* * * * *